United States Patent Office 2,772,505
Patented Dec. 4, 1956

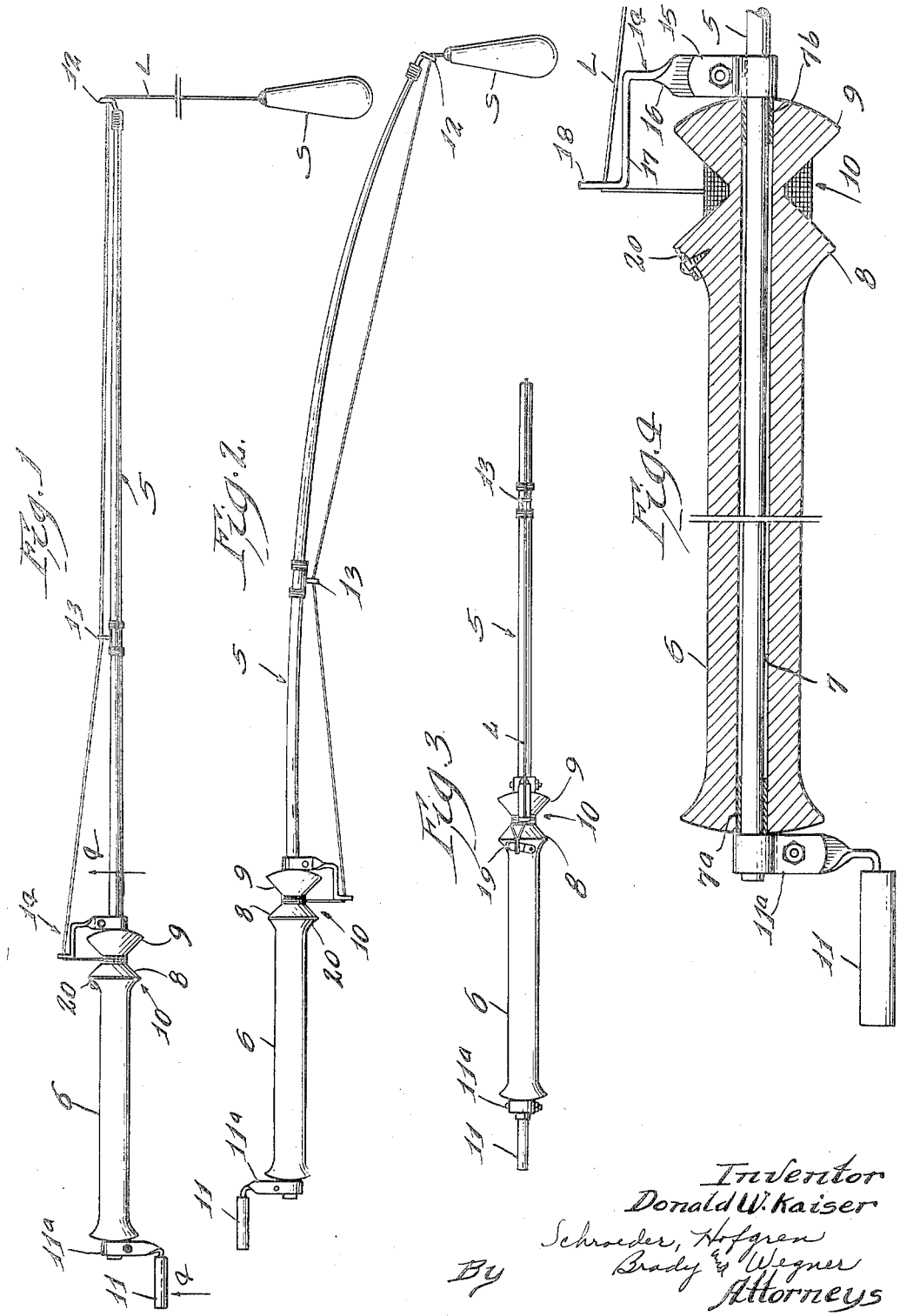

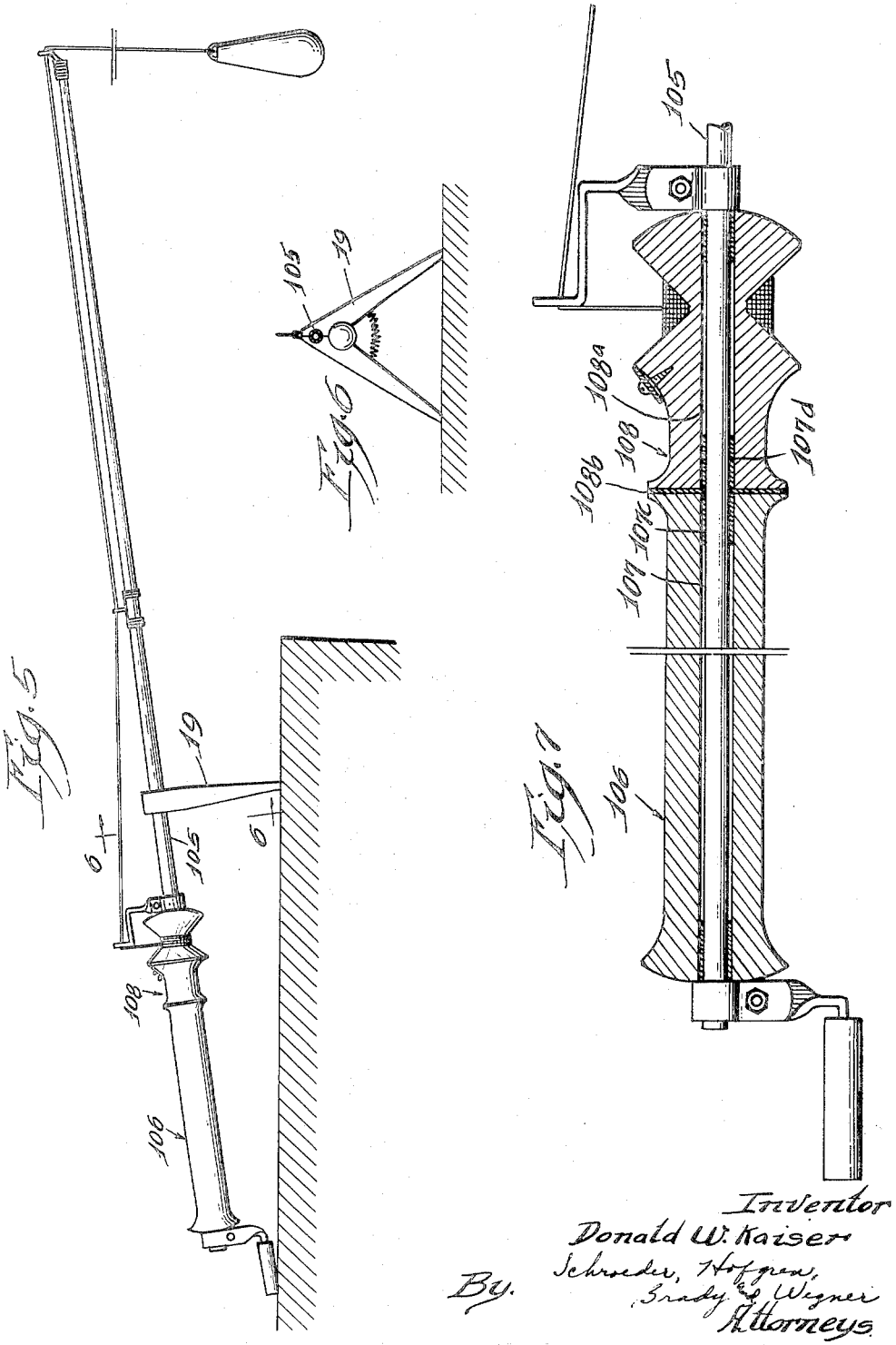

2,772,505
FISHING DEVICE
Donald W. Kaiser, Adrian, Mich.

Application May 11, 1954, Serial No. 429,000

7 Claims. (Cl. 43—20)

This invention relates to a fishing device, and in particular it relates to a very inexpensive fishing rod and reel combination which has a handle journaled on the rod provided with an integral line receiving spool.

In accordance with the present invention, a fishing rod is provided with a handle which has a central longitudinal bore, and the rod extends entirely through the handle and has a crank behind the handle by means of which the rod may be rotated with respect thereto. At the forward end of the handle is a circumferential recess which serves as a line receiving spool. The rod is provided with the usual line guides, and in addition is provided adjacent the spool with a winding guide which has an eye above the spool. The line may be wound upon the spool by turning the crank at the rear of the handle. The handle is held against longitudinal movement by the crank and the line guide.

The device of the present invention possesses a number of advantages. In the first place, it is extremely inexpensive, and combines rod and reel in a single unit.

Furthermore, the device may be handled either by the rod or by the handle. If the angler grasps the rod immediately forward of the handle, the weight of a moderate size sinker is sufficient to rotate the handle on the rod and pay out line until the handle is grasped to stop the rotation.

A very unusual and important result of the present construction is that when the rod is grasped by the handle, line will pay out very freely as long as the rod is aligned with the line, or nearly so; but if the line pulls at an angle through the guides so that the rod is bowed from the pull of a fish, the line is automatically snubbed and pays out only with great difficulty. Thus, a fish may be permitted to run by holding the rod in alignment with the direction of travel of the line, and may be snubbed by lifting the rod so that the pull of the line puts a bow in the rod.

The invention is illustrated in a preferred embodiment and an alternative embodiment in the accompanying drawings in which:

Fig. 1 is an elevational view of a fishing device constructed in accordance with the present invention taken with the winding guide seen in side elevation;

Fig. 2 is a view similar to Fig. 1 with the rod bowed by tension on the line, which prevents unreeling;

Fig. 3 is a fragmentary view similar to Fig. 1 showing the line hooked onto the line catch;

Fig. 4 is an enlarged fragmentary sectional view taken as indicated along the line 4—4 of Fig. 1;

Fig. 5 is a view similar to Fig. 1 showing a modified form of the device in which the spool is separate from the handle, the device being supported on a clothespin-type prop;

Fig. 6 is a section taken as indicated along the line 6—6 of Fig. 5; and

Fig. 7 is an enlarged fragmentary view of the device of Fig. 5.

Referring to the drawings in greater detail, a fishing rod, indicated generally at 5, is preferably formed from fiberglass or other suitable highly flexible material which has considerable strength in torsion. As best seen in Fig. 4, a handle 6 which may conveniently be turned from wood is provided with a central bore 7, in the ends of which are bearing members 7a and 7b. A pair of spaced diverging annular bosses 8 and 9 formed on the forward part of the handle flank a recess to form a line receiving spool 10. The rod 5 extends entirely through the bore 7 in the handle and spool, and a crank 11 is secured to the rear end of the rod by a clamp 11a. The crank provides means by which the rod 5 may be rotated within the handle and spool, and prevents the rod from sliding out of the handle. A conventional tip guide 12 and intermediate line guide 13 are lashed to the rod 5 in the customary manner.

Secured to the rod 5 immediately forward of the spool portion 10 of the handle, and cooperating with the crank 11 to retain the handle against endwise movement, is a winding guide, indicated generally at 14, which has an attaching clamp 15, an upright supporting stem 16, a rearwardly directed finger 17 which overlies the forward portion of the spool 10, and a line guiding eye 18 which is perpendicular to the axis of the spool, and is positioned directly above the spool. A line L may be wound on the spool 10, and carried through the eye 18 of the winding guide and through the line guide 13 and tip guide 12 in the customary fashion. A sinker S is shown on the end of the line.

The use of the device is believed to be clear from the foregoing detailed description. A fish hook may be fastened on the line L in addition to the sinker S, and a bobber may also be used if desired, in the usual manner. If the rod 5 is grasped and the handle left free, the pull of the sinker causes the line to pay out freely by rotating the handle with respect to the rod. Line is rewound on the spool 10 by grasping the handle 6 and turning the crank 11, which it will be noted extends from the rod 5 in a direction opposite to that of the winding guide 14. Turning the crank 11 rotates the rod 5 inside the handle and the spool, and the winding guide 14 circling around the spool lays the line evenly on the spool.

When the angler is holding the handle 6, a fish on the hook may take line freely as long as the rod 5 is aligned with the direction of pull on the line, because the straight pull on the line tends to unreel line from the spool 10, and the transverse pull of the line on the eye 18 of the winding guide 14 carries the guide around the spool 10, and turns the rod with it, feeding line off the spool. But as soon as the rod is lifted so that the line pulls down in the tip guide 12, and bows the rod 5 as seen in Fig. 2, there is a snubbing action which prevents line from unwinding from the spool 10. Thus, to let a fish run, the rod 5 is held in alignment with the direction of movement of the line, and to stop the fish's run it is merely necessary to raise the rod so the line pulls down in the guide 12. The snubbing action results from the fact that the downward pull of the line L in the tip guide 12 tends to hold the guide 12 down and prevent rotation of the rod. The height of the line guide provides a lever arm, and bending of the rod due to the pull of the line increases the lever arm. This positively prevents unwinding by providing a force tending to keep the rod from rotating, and the force is great enough to overcome the rotational force of the line on the winding guide eye 18.

The rod is specially useful in ice fishing, in which, as seen in Fig. 5, the rod may be rested in a standard two legged clothespin-type prop clamp 19. The crank may be turned straight down, which keeps the handle off the ice so it is dry.

With the prop clamp 19 on the rod, the line reels out freely because the rod is held in the clamp and the handle may spin. To prevent the sinker or hook from going to the bottom of the lake if no bobber is used, a line catch 20 is secured to the annular boss 8, and as seen in Fig. 3 the line L may be hooked around the line catch. Preferably the line catch 20 is in light frictional engagement with the boss 8, so that if a fish takes the hook the catch may swing forwardly to release the line and prevent a large fish from breaking it. There is no problem of tangling line in the prop, because when reeling in, the rod and prop rotate together.

The modified device illustrated in Fig. 6 is similar to the preferred device; but the handle and spool are made in two parts. Thus, there is a rod 105, a handle 106 having a bore 107, and a spool 108 having a bore 108a so that the rod 105 may extend through both bores, and the spool 108 is forward of and coaxial with the handle 106. A wear plate 108b is positioned between the handle and spool; and there are bearing sleeves 107c and 107d in the handle and spool, respectively, adjacent the wear plate, as well as bearing sleeves 107a and 107b at the outer ends of the handle and spool. Otherwise the modified device is like the preferred form.

The foregoing detailed description is given for clearness of understanding only and no unnecessary limitations are to be understood therefrom, as some modifications will be obvious to those skilled in the art.

I claim:

1. A fishing device comprising: an elongated rod; a handle journaled on the rear of the rod; a spool journaled on the rod forward of the handle; crank means for rotating the rod in the handle and spool; and line guide means secured to the rod which includes a line guide forward of the spool and a winding guide overhanging the spool.

2. A fishing device comprising: an elongated rod; a handle journaled on the rear of the rod which has an integral, coaxial spool at its forward end; a crank on the rod behind the handle for rotating the same; and line guide means secured to the rod which includes a line guide forward of the spool and a winding guide overhanging the spool.

3. A fishing device comprising: an elongated flexible rod; a handle concentrically journaled on the rear of the rod; a spool concentrically journaled on the rod forward of the handle; crank means for rotating the rod in the handle and spool; and line guide means secured to the rod which includes a line guide forward of the spool and a winding guide overhanging the spool.

4. A fishing device comprising: an elongated rod; a handle journaled on the rear of the rod; a spool journaled on the rod forward of the handle; crank means for rotating the rod in the handle and spool; a line winding guide secured to the rod which overhangs the spool; and a line guide on the rod forward of the winding guide and on the same side of the rod as said winding guide.

5. A fishing device comprising: a flexible rod; a handle concentrically journaled on the rear of the rod which has an integral, co-axial spool at its forward end; a crank secured to the rod behind the handle; a plurality of aligned line guides secured to the rod forward of the spool; and a winding guide secured to the rod and projecting from the same side of the rod as the line guides, said winding guide including an upwardly and rearwardly extending mounting portion which projects over the spool and having an eye therein above the spool the axis of which is substantially parallel to the axis of the spool.

6. The device of claim 5 in which the crank extends in the opposite direction from the line guides.

7. The device of claim 5 in which the winding guide is positioned on the rod immediately ahead of the spool.

References Cited in the file of this patent

UNITED STATES PATENTS

| 779,937 | Holt | Jan. 10, 1905 |
| 2,537,613 | Allen | Jan. 9, 1951 |
| 2,675,193 | Hull | Apr. 13, 1954 |

FOREIGN PATENTS

| 123,643 | Sweden | Dec. 21, 1948 |
| 878,579 | Germany | June 5, 1953 |